(12) United States Patent  (10) Patent No.: US 8,666,920 B2
Najork et al.  (45) Date of Patent: Mar. 4, 2014

(54) ESTIMATING SHORTEST DISTANCES IN GRAPHS USING SKETCHES

(75) Inventors: Marc A. Najork, Palo Alto, CA (US); Sreenivas Gollapudi, Cupertino, CA (US); Rina Panigrahy, Sunnyvale, CA (US); Atish Das Sarma, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 1054 days.

(21) Appl. No.: 12/705,630

(22) Filed: Feb. 15, 2010

(65) Prior Publication Data

US 2011/0202846 A1 Aug. 18, 2011

(51) Int. Cl.
*G06F 17/00* (2006.01)
*G06N 5/04* (2006.01)

(52) U.S. Cl.
CPC .................................. *G06N 5/04* (2013.01)
USPC ................................................ 706/46

(58) Field of Classification Search
None
See application file for complete search history.

(56) References Cited

U.S. PATENT DOCUMENTS

| | | |
|---|---|---|
| 2003/0033582 A1 | 2/2003 | Klein et al. |
| 2004/0109603 A1* | 6/2004 | Bitter et al. .................... 382/154 |
| 2007/0230488 A1 | 10/2007 | Yu et al. |
| 2009/0040931 A1* | 2/2009 | Bast et al. ..................... 370/238 |

OTHER PUBLICATIONS

Baswana, et al., "Faster Algorithms for Approximate Distance Oracles and All-Pairs Small Stretch Paths", Retrieved at <<http://ieeexplore.ieee.org/stamp/stamp.jsp?tp=&arnumber=4031394&isnumber=4031330>>, Proceedings of the 47th Annual IEEE Symposium on Foundations of Computer Science (FOCS'06), Oct. 2006, pp. 10.
Gavoille, et al., "Approximate Distance Labeling Schemes", Retrieved at <<https://eprints.kfupm.edu.sa/26287/1/26287.pdf>>, Aug. 2001, pp. 4.
Wu, et al., "Mining Scalefree Networks using Geodesic Clustering", Retrieved at <<http://mgarland.org/files/papers/gal-kdd.pdf>>, 2004, pp. 6.
Bazzaro, et al., "Distance Labeling for Permutation Graphs", Retrieved at <<http://dept-info.labri.fr/~gavoille/article/BG05a>>, 2005, pp. 7.
Bader, et al., "Parallel Algorithms for Evaluating Centrality Indices in Real-world Networks", Retrieved at <<https://sdm.lbl.gov/~kamesh/papers/ParalleIBC-ICPP06.pdf>>, Dec. 23, 2009, pp. 1-9.
Baswana, et al., "Distance Oracles for Unweighted Graphs: Breaking the Quadratic Barrier with Constant Additive Error", Retrieved at <<http://www.cse.iitd.ac.in/~ssen/conf/icalp08.pdf>>, Dec. 23, 2009, pp. 12.

(Continued)

*Primary Examiner* — Alan Chen
(74) *Attorney, Agent, or Firm* — Micah Goldsmith; Andrew Sanders; Micky Minhas (57) ABSTRACT

Sketches are generated for each node in a graph. For undirected graphs, each sketch for a node may include an indicator of a node from a seed set of nodes and the shortest distance between the node and the indicated node. When a request is received for the shortest distance between two nodes of the graph, the sketches for each of the two nodes are retrieved, and nodes that are indicated in both of the sketches are determined. The distances between each of the two nodes and a determined node as indicated in the sketches is summed for each of the determined nodes, and the sum having the least distance is selected as the estimated shortest distance between the two nodes.

20 Claims, 6 Drawing Sheets

(56) References Cited

OTHER PUBLICATIONS

Thorup, et al., "Approximate Distance Oracles", Journal of the ACM, vol. 52, Issue 1, Jan. 2005, pp. 1-24.

Sarma, et al., "A Sketch-Based Distance Oracle for Web-Scale Graphs", Retrieved at <<http://research.microsoft.com/apps/pubs/default.aspx?id=115785>>, Feb. 2010, p. 1.

* cited by examiner

ESTIMATING SHORTEST DISTANCES IN GRAPHS USING SKETCHES

BACKGROUND

Graphs typically include multiple nodes or vertices connected to one another by one or more edges. Graphs may be directed or undirected, and may have a weight, a length, or a cost associated with one or more of the edges. Graphs are useful for modeling many real world systems such as the World Wide Web and transportation systems such as highways. One frequently performed operation on a graph is the computation of the shortest distance between two nodes of the graph. For example, in a graph representing a highway system, a user may request the shortest distance between their house and their destination before embarking on a trip. Accordingly, the user may use the graph to determine the shortest distance.

Existing methods for computing the shortest distance in a graph between two nodes include Dijkstra's algorithm and the A* search algorithm. However, these methods have several drawbacks. For example, as the number of nodes and edges in a graph grows, the time and computing resources needed by these methods to calculate the shortest distance may become burdensome. Users have become accustomed to near instantaneous results from computing applications, making such time and resource requirements unacceptable.

SUMMARY

Sketches are generated for each node in a graph. For undirected graphs, each sketch for a node may include a plurality of pairs, each pair consisting of an indicator of a node from a seed set of nodes and the shortest distance from the node to the indicated node. When a request is received for the shortest distance between two nodes of the graph, the sketches for each of the two nodes are retrieved, and seed nodes that are indicated in both of the sketches are determined. The distances between each of the two nodes and a determined seed node as indicated in the sketches is summed for each of the determined seed nodes, and the sum having the least distance is selected as the estimated shortest distance between the two nodes. The sketches for each node may be generated prior to receiving requests for shortest distance estimations, allowing the shortest distance to be quickly estimated when a request is received by retrieving the pre-generated sketches.

In an implementation, identifiers of a first node and a second node from an undirected graph are received. A first sketch corresponding to the first node and a second sketch corresponding to the second node are retrieved. The first sketch may include identifiers of a first subset of nodes from the undirected graph and distances between each node in the first subset of nodes and the first node, and the second sketch may include identifiers of a second subset of nodes from the undirected graph and distances between each node in the second subset of nodes and the second node. At least one node that is identified in both the first subset of nodes and the second subset of nodes is determined. For each determined node, the distance between the determined node and the first node is summed with the distance between the determined node and the second node by the computing device. A distance between the first node and the second node is estimated as the least summed distance. The estimated distance is presented to a user.

Implementations may include some or all of the following features. The first sketch may be generated for the first node in the undirected graph. Generating the first sketch for the first node in the undirected graph may include selecting a seed set and generating a sketch for each node in the undirected graph, comprising determining a node from the seed set that is closest to the given node, and adding an indicator of the closest node from the seed set of nodes and a distance between the given node and the closest node to the sketch. The selecting and generating operations may be repeated with increasingly larger seed sets at each iteration. Each seed set may be increased by a factor of two, for example, at each iteration.

In an implementation, identifiers of a first node and a second node from a directed graph may be received. A first sketch corresponding to the first node may be retrieved. The first sketch may include identifiers of a first subset of nodes from the directed graph and distances from the first node to each node in the first subset of nodes. A second sketch corresponding to the second node may be retrieved. The second sketch may include identifiers of a second subset of nodes from the directed graph and distances from each node in the second subset of nodes to the second node. Each node that is identified in both the first subset of nodes and the second subset of nodes is determined. For each determined node, the distance from the first node to the determined node and the distance from the determined node to the second node are summed. The distance from the first node to the second node is estimated as the least summed distance.

Implementations may include some or all of the following features. The estimated distance may be presented to a user. A sketch may be generated for each node in the directed graph. Generating a sketch for each node in the directed graph may include: selecting a seed set, and generating a sketch for each node in the directed graph, comprising a first subset of nodes and a second subset of nodes, and comprising: (a) determining a node from the seed set that is closest to the given node in the directed graph on a path from the given node to the node from the seed set; (b) determining a node from the seed set that is closest to the given node in the directed graph on a path from the node from the seed set to the given node; (c) adding the node determined by operation (b) to the first subset of nodes, paired with the distance from the given node to the determined node; and (d) adding the node determined by operation (c) to the second subset of nodes, paired with the distance from the determined node to the given node. Operations (a)-(d) may be repeated with increasingly larger seed sets at each iteration. Each seed set may be increased by a factor of two, for example, at each iteration.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
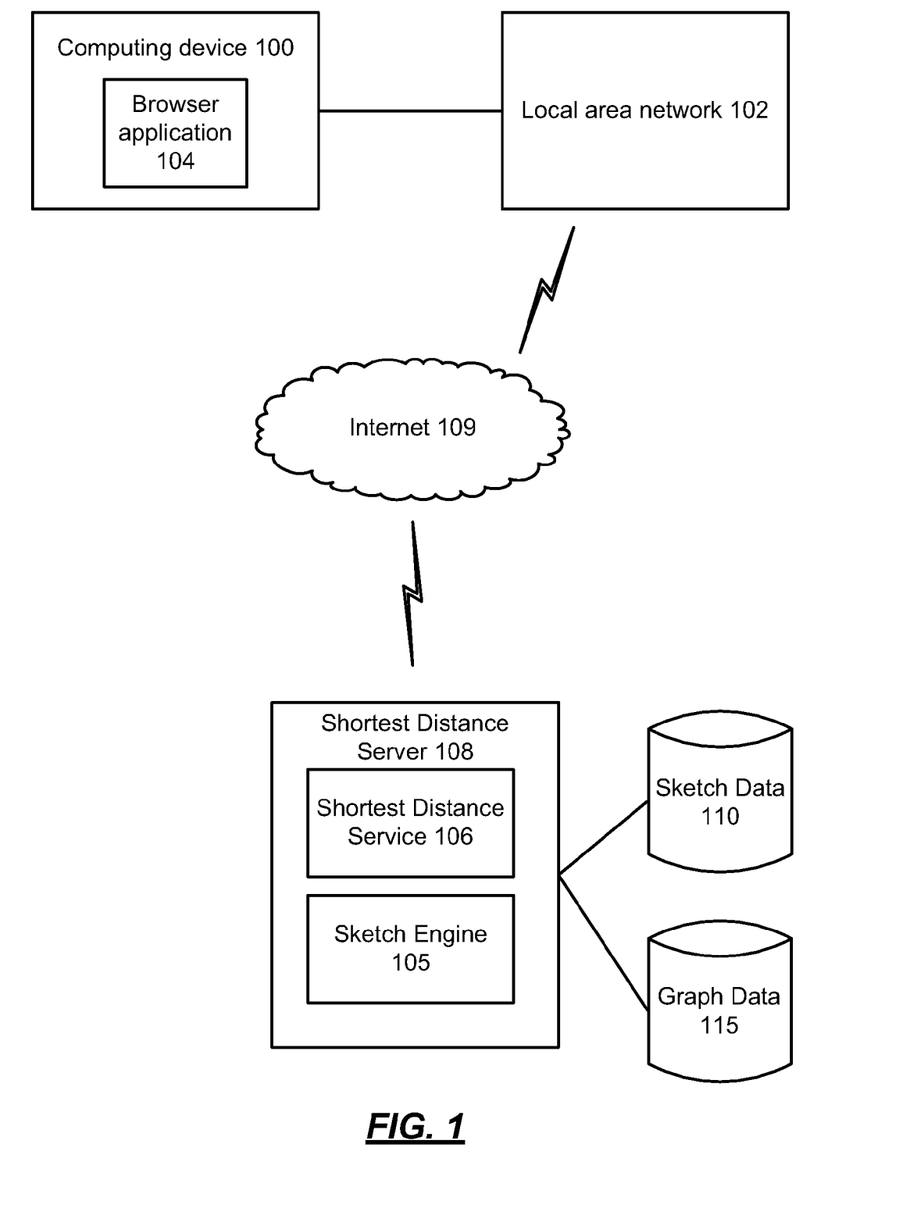
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not specifically shown) facilitating communications over a communications medium. The computing device 100 may communicate with a local area network 102 via a physical connection, for example. Alternatively, the computing device 100 may communicate with the local area network 102 via a wireless wide area network or a wireless local area network media, or via other communications media. The computing device 100 may be a general purpose computing device such as the computing device 600 described with respect to FIG. 6, for example.

A user of the computing device 100, as a result of the supported network medium, is able to access network resources, typically through the use of a browser application 104 running on the computing device 100. The browser application 104 facilitates communication with a remote network over, for example, the Internet 109. One exemplary network resource is a shortest distance service 106, running on a shortest distance server 108. As will be described further below, in some implementations, the shortest distance service 106 may receive identifiers of nodes of a graph, represented by graph data 115, from the user of the computing device 100, and use sketch data 110 associated with the graph to estimate the shortest distance between the two nodes of the graph. The estimated shortest distance may then be returned to the user at the computing device 100. The shortest distance server 108 and/or the shortest distance service 106 may be implemented using one or more general purpose computing devices such as the computing device 600 described with respect to FIG. 6, for example.

As described above, a graph may include one or more nodes or vertices connected to one another by one or more edges. Each edge may further have a value or cost that may represent the cost of traveling between the two nodes. The total cost of traveling on a path from one node to another node may be determined by adding the values of each of the edges of the path and is referred to herein as the distance between the two nodes. The path between two nodes with the lowest cost in the graph is the shortest distance between the two nodes.

A graph can be a directed graph or an undirected graph. In a directed graph, edges between nodes are one-way. In an undirected graph, edges between nodes are two-ways. An example of an undirected graph is a map because roads typically allow travel in both directions. An example of a directed graph is the World Wide Web graph because hyperlinks only link to web pages in one direction. Other examples of a directed graph may include a plumbing system, for example. As may be appreciated, graphs are useful ways to represent many real world systems.

For directed graphs, the edges that lead to a node are referred to as the in-edges of the node. Similarly, the edges that lead out of the node (e.g., to other nodes) are referred to as the out-edges of the node. Because undirected graphs have two-way movement, the number of in-edges and out-edges for a node in an undirected graph is the same.

In some implementations, the shortest distance server 108 may store one or more graphs as graph data 115. The graph data 115 may include a variety of directed and undirected graphs with each graph representing a variety of systems. In some implementations, the graph data 115 may be stored as a table with an entry for each node and a list of the edges associated with the node and their respective weights or costs. Where the graphs are directed, the direction of each edge may also be indicated. However, any data structure or technique for storing graphs may be used. In addition, metadata or other descriptive data may also be stored with the graph data 115. For example, where the graph data 115 represents a map, names of the locations associated with each node may be stored.

To facilitate the estimation of shortest distances between nodes of a graph, the shortest distance server 108 may include a sketch engine 105. The sketch engine 105 may generate one or more sketches for each node of the graph data 115. As described further herein, in some implementations, a sketch may comprise a list, table, or other data structure that is associated with each node in the graph and includes indicators of some subset of the nodes of the graph along with known shortest distances between the node and the identified nodes in the subsets of the nodes. These generated sketches may be stored by the sketch engine 105 as the sketch data 110. In some implementations, the sketch data 110 may be pre-generated by the sketch engine 105. The pre-generated sketches may then be used by the shortest distance service 106 to estimate the shortest distance between two nodes of the graph. By pre-computing the sketch data 110, the shortest distance service 106 may quickly respond to received queries using the pre-generated (also may be referred to as "pre-computed") sketches.

For undirected graphs, the sketch engine 105 may generate a sketch for a node N by first selecting what is referred to herein as a "seed set" of nodes. In some implementations, the seed set may be randomly selected from the nodes in the graph data 115. In other implementations, heuristics may be used to select or favor certain (e.g., "more important") nodes. For example, nodes with at least two edges may be favored for selection. Other heuristics may also be used.

After selecting the seed set of nodes, the sketch engine 105 may determine the node from the seed set that is closest to the node N. In some implementations, the node that is closest may be determined by using a breadth first search of the graph starting from the nodes from the seed set of nodes. Other methods for determining the closest node from the seed set may also be used. An identifier of the closest node from the seed set to the node N may be recorded in the sketch data 110 for the node N, along with the calculated shortest distance.

The sketch engine 105 may perform the above described operations in multiple iterations, with the number of seeds selected for the seed set increased at each successive iteration. In some implementations, the number of seeds in each seed set may be increased by a factor of two for each iteration. However, other factors may also be selected. The sketch engine 105 may perform K iterations of the above described algorithm. The value of K selected may be determined based on the number of nodes in the graph data 115, and the available computing resources or desired accuracy, for example.

For directed graphs, the sketch engine 105 may generate a sketch for a node N by selecting the set of seed nodes as described for an undirected graph, with each sketch for a node including plurality of seed and distance pairs, with one pair per seed set. However, rather than the sketch including just an indicator of the closest node from each seed set along with the calculated shortest distance, the sketch may include an indicator of the node from the seed set that is the closest node to the node N on a path from node N, and an indicator of the node from the seed set that is closest to the node N on a path to the node N from the closest node from the seed set. The distance calculation for both of the indicated nodes may also be included in the sketch. Similarly, as described for the undirected graph, the closest nodes may be determined using breadth first searches from the nodes of the seed sets.

The shortest distance service 106 of the shortest distance server 108 may use the generated sketches to estimate the shortest distance between a first node and a second node of a graph represented by the graph data 115. For example, the shortest distance service 106 may receive a query from a user of the computing device 100 for the estimated shortest distance between two nodes of a graph represented by the graph data 115.

For undirected graphs, the shortest distance service 106 may retrieve the generated sketch for the first node and the generated sketch for the second node from the sketch data 110. The shortest distance service 106 may determine the nodes that have indicators in both the generated sketch for the first node and the generated sketch for the second node. As described above, the indicated nodes of each sketch represent the nodes that were the closest nodes from each of the seed sets for one or more iterations of the sketch generation algorithm. Therefore, each node that is indicated by both the sketch for the first node and the sketch for the second node represents a node that is on a path between the first node and the second node.

The shortest distance service 106, for each determined node from both the sketch of the first node and the sketch of the second node, may sum the distance between the first node and the determined node with the distance between the second node and the determined node. Each generated sum represents the distance of a path between the first node and the second node.

The shortest distance service 106 may then select the generated sum having the shortest distance. The generated sum having the shortest distance may be returned to the computing device 100 as the estimated shortest distance between the first node and the second node.

In implementations where the graph data 115 is a directed graph, the shortest distance service 106 may estimate the shortest distance from a first node to a second node by also determining nodes that are indicated by both the sketch of the first node and the sketch of the second node. As described above, for directed graphs, each sketch for a node N may indicate a set of nodes, with one indicated node for each seed set, that are the nodes that were the closest node for a seed set on a path from the node N. Each sketch may further indicate a set of nodes, with one indicated node from each seed set, that are the nodes that were the closest node for a seed set on a path to the node N. For each of the determined nodes, the distances for the determined node in the first sketch may be summed with the distance for the determined node in the second sketch, and the least summed distance may be selected as the estimated shortest path from the first node to the second node.

In other implementations, for undirected graphs, the sketch for a node N may include, for each seed set, a shortest distance from the node N to any of the nodes in the seed set. The shortest distance service 106 may estimate the shortest distance between a first node and a second node of a graph by, for each seed set, determining the absolute value of the difference between the shortest distance to the seed set from the first node and the shortest distance to the seed set from the second node. The greatest determined absolute value may by selected by the shortest distance service 106 as the estimated shortest distance between the first node and the second node.

Figure 2:
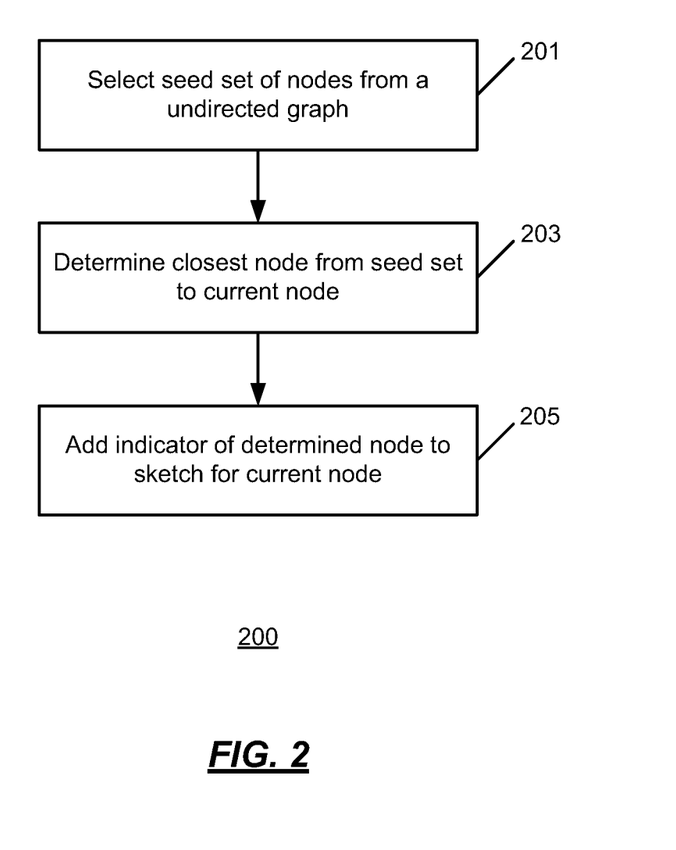
FIG. 2 is an operational flow of a method for generating a sketch for a node of an undirected graph.

FIG. 2 is an operational flow of a method 200 for generating a sketch for a node of an undirected graph. The method 200 may be implemented by the sketch engine 105 of the shortest distance server 108, for example.

A seed set of nodes may be selected from an undirected graph (201). The seed set of nodes may be selected by the sketch engine 105. In some implementations, the seed set may be randomly selected from the undirected graph. In other implementations, heuristics may be used to guide the selection such as favoring nodes with high edge counts.

The number of nodes selected for the seed set may be increased for subsequent iterations of the method 200 for a current node of the nodes in the undirected graph. In some implementations, the number of nodes in the seed set may be increased by a factor of two for each iteration of the method 200. Other factors may also be used.

A node from the seed set that is closest to the current node is determined (203). The closest node may be determined by the sketch engine 105. In some implementations, the closest node may be determined by performing a breadth first search from each node in the seed set until the current node is reached. Other methods may also be used.

An indicator of the closest node to the current node is added to a sketch for the current node (205). The indicator of the closest node and the distance of the current node to the closest node may be added to the sketch by the sketch engine 105. In some implementations, the method 200 may continue at 201 where another iteration of the method 200 may be performed for a larger seed set. After K iterations of the method 200 have been completed, the generated sketch may be stored in the sketch data 110 for use by the shortest distance service 106 as the sketch for the current node. K iterations of the method 200 may be subsequently performed for each node in the undirected graph to generate a sketch for each node in the undirected graph. Given a seed set, in an implementation, a single breadth-first search is performed to determine seed and distance pairs for all nodes in the graph at the same time. In such an implementation, a separate breadth-first search is not performed for each node to determine a seed and distance pair for each node.

Figure 3:
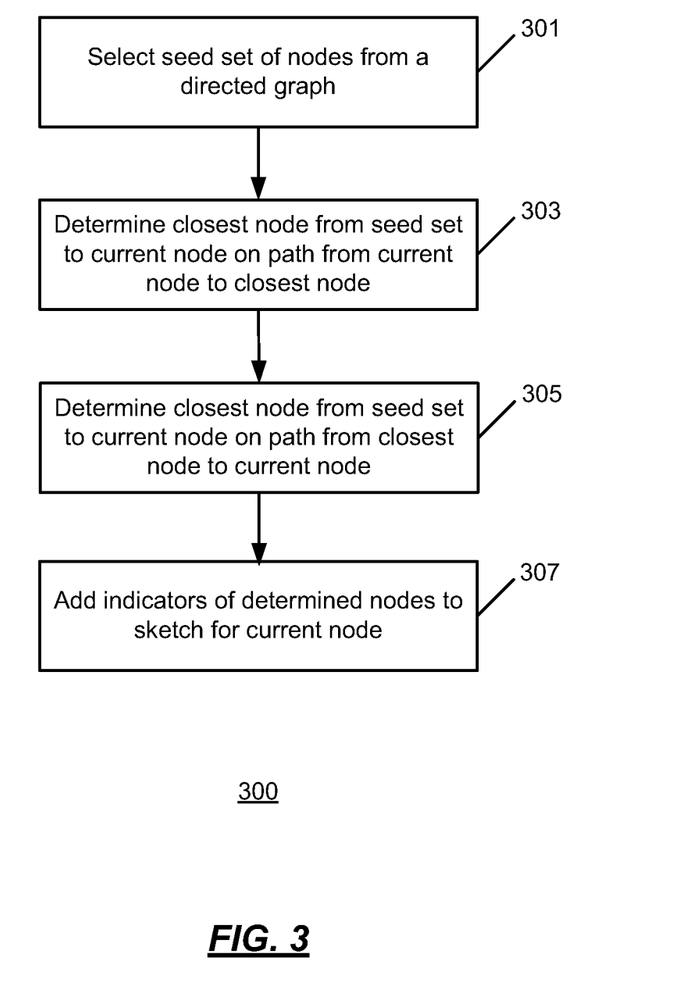
FIG. 3 is an operational flow of a method for generating a sketch for a node of a directed graph.

FIG. 3 is an operational flow of a method 300 for generating a sketch for a node of a directed graph. The method 300 may be implemented by the shortest distance service 106 of the shortest distance server 108.

A seed set of nodes is selected from a directed graph (301). Similarly as described above in method 200, the seed set of nodes may be selected by the sketch engine 105. In some implementations, the seed set may be randomly selected from the directed graph. In other implementations, heuristics may be used to guide the selection such as favoring nodes with a high number of edges.

A node is determined from the seed set of nodes that is closest to the current node in the directed graph on a path from the current node to the node from the seed set of nodes (303). The node may be determined by the sketch engine 105. In some implementations, the node may be determined by doing a breadth first search from the nodes from the set of nodes by following in-edges backwards from the seed nodes until the current node is reached.

A node is determined from the seed set of nodes that is closest to the current node in the directed graph on a path from the node from the seed set of nodes to the current node (305). The node may be determined by the sketch engine 105. In some implementations, the node may be determined by doing a breadth first search from the nodes from the set of nodes by following out-edges from the seed nodes until the current node is reached.

Indicators of the determined nodes are added to the sketch for the current node (307). The indicators may be added to the sketch by the sketch engine 105. As described above, the sketch for a node of a directed graph may include two tables or sets of node indicators. One set may be for identifiers of the closest nodes on a path from the current node and one set of identifiers may be for the nodes that are closest to the current node on a path to the current node. The determined node indicators may be placed in their respective sets along with the distance from the nodes to or from the current node. In some implementations, the method 300 may continue at 301 where another iteration of the method 300 may be performed for a larger seed set. After K iterations have been completed, the generated sketch may be stored in the sketch data 110 for use by the shortest distance service 106 as the sketch for the current node of a directed graph. K iterations of the method 300 may be subsequently performed for each node in the directed graph to generate a sketch for each node in the directed graph. As noted above, in an implementation, a single breadth-first search may be performed to determine seed and distance pairs for all nodes in the graph at the same time, as opposed to performing a separate breadth-first search determine a seed and distance pair for each node.

Figure 4:
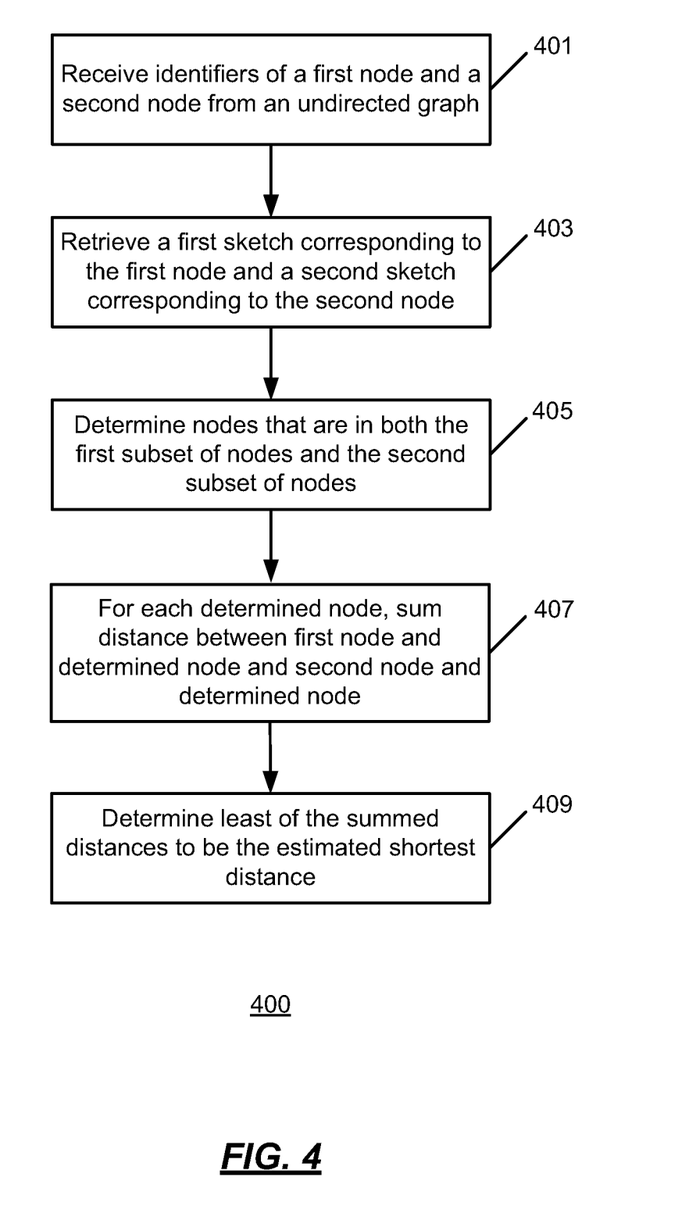
FIG. 4 is an operational flow of a method for estimating the shortest distance between two nodes of an undirected graph.

FIG. 4 is an operational flow of a method 400 for estimating the shortest distance between two nodes of an undirected graph. The method 400 may be implemented by the shortest distance service 106 of the shortest distance server 108.

Identifiers of a first node and a second node from an undirected graph are received (401). The identifiers of a first and a second node may be received by the shortest distance service 106 from a user at a computing device 100. The user may want an estimation of the shortest distance between the first node and the second node in a graph from the graph data 115. In some implementations, the user may further specify an identifier of the graph that the identified first and second nodes are part of. For example, a user may wish to receive an estimation of the shortest distance between New York and San Francisco. Accordingly, the user may identify New York and San Francisco as the first and second nodes of a graph representing a map of the United States.

A first sketch corresponding to the first node and a second sketch corresponding to the second node are retrieved (403). The first and second sketches may be retrieved from the sketch data 110 by the shortest distance service 106. In some implementations, the first sketch may include a first subset of nodes from the undirected graph and a distance between each node in the first subset of nodes and the first node, and the second sketch may include a second subset of nodes from the undirected graph and a distance between each node in the second subset of nodes and the second node. As described previously with respect to FIG. 2, a sketch may have been generated by the sketch engine 105 for each of the nodes in the undirected graph.

A determination is made of each node that is in both the first subset of nodes and the second subset of nodes (405). The determination may be made by the shortest distance service 106. The nodes that are in both the first subset and the second subset represent the nodes that overlap between the first sketch and the second sketch. Thus, each of the nodes that are in the first and second subsets is on at least one path between the first node and the second node.

For each determined node, the distance between the determined node and the first node is summed with the distance between the determined node and the second node (407). The distances may be summed by the shortest distance service 106. As described above, because each determined node is part of a path between the first node and the second node, the sums of the distances to a determined node from the first node and the second node represents the distance of a path between the first node and the second node.

The least of the summed distances is determined to be the estimated shortest distance between the first and second nodes (409). The determination may be made by the shortest distance service 106. In some implementations, the estimated distance may be provided to a user at the computing device 100, for example.

Figure 5:
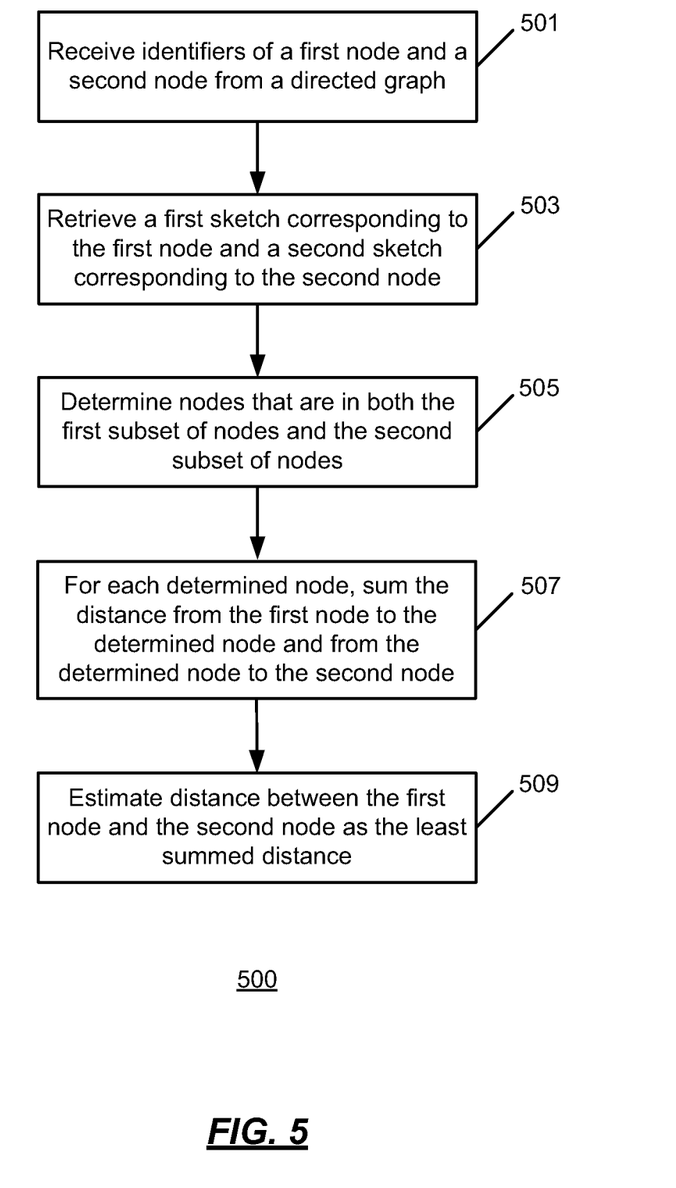
FIG. 5 is an operational flow of a method for estimating the shortest distance between two nodes of a directed graph.

FIG. 5 is an operational flow of a method 500 for estimating the shortest distance between two nodes of a directed graph. The method 500 may be implemented by the shortest distance service 106 of the shortest distance server 108.

Identifiers of a first node and a second node of a directed graph are received (501). The identifiers may be received by the shortest distance service 106 from a user at the computing device 100. For example, the directed graph may represent the Internet with nodes representing web pages, and edges between nodes representing links to the web pages. The user may want to know an estimate of the shortest number of links that lead from the web page corresponding to the first node to the web page corresponding to the second node, for example.

A first sketch corresponding to the first node and a second sketch corresponding to the second node are retrieved (503). The sketches may be retrieved by the shortest distance service 106 from the sketch data 110. The first sketch may include a first subset of nodes from the directed graph and a distance from the first node to each node in the subset. Similarly, the second sketch may include a second subset of nodes from the directed graph and a distance from each node in the second subset of nodes to the second node.

In some implementations, each sketch may include two sets or tables of node identifiers. As described previously, for directed graphs, the sketches for a node N may include two sets of nodes with one set including nodes and distances from the node N to the nodes, and the other set including nodes and distances to the node N from the nodes. The nodes for both sets were determined from seed sets selected from the directed graph of increasingly greater sizes.

A determination is made of each node that is in both the first subset of nodes and the second subset of nodes (505). The determination may be made by the shortest distance service 106.

For each determined node, the distance from the first node to the determined node and the distance from the determined node to the second node is summed (507). The sum may be determined by the shortest distance service 106.

A distance from the first node to the second node is estimated as the least summed distance (509). The estimation may be made by the shortest distance service 106.

Figure 6:
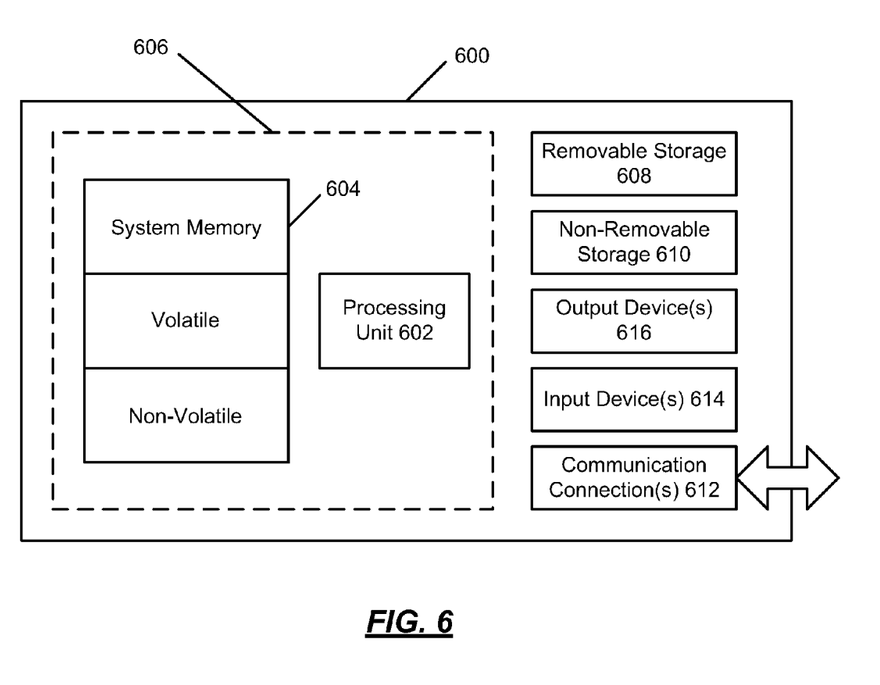
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
a sketch engine that:
receives a graph through a network, wherein the graph comprises a plurality of nodes;
selects a seed set of nodes from the plurality of nodes; and
generates a first sketch for a first node of the graph and a second sketch for a second node of the graph based on the selected seed set; and
a shortest distance service executed by a shortest distance server that:
receives an indicator of the first node and an indicator of the second node;
retrieves the first sketch and the second sketch; and
estimates a shortest distance between the first node and the second node using the first sketch and the second sketch.

2. The system of claim 1, wherein the sketch engine generates the first sketch based on the selected seed set by:
determining a node from the seed set that is closest to the first node, and adding an indicator of the closest node from the seed set of nodes and a distance between the first node and the closest node to the first sketch.

3. The system of claim 2, wherein the sketch engine repeats selecting a seed set, determining a node from the seed set that is closest to the first node, and adding an indicator of the closest node from the seed set of nodes and a distance between the first node and the closest node to the first sketch with increasingly larger seed sets at each iteration.

4. The system of claim 3, wherein the sketch engine increases the seed set by a factor of two at each iteration.

5. The system of claim 2, wherein each node has one or more edges, and the sketch engine favors nodes with a greater number of edges when selecting the seed set of nodes.

6. The system of claim 5, wherein the sketch engine favors nodes with two or more edges when selecting the seed set of nodes.

7. The system of claim 2, wherein determining the node from the seed set of nodes that is closest to the first node is determined using a breadth first search.

8. The system of claim 1, wherein the first sketch comprises a shortest distance from the first node to each of a plurality of seed sets of nodes from the graph and the second sketch comprises a shortest distance from the second node to each of the plurality of seed sets of nodes from the graph, and the shortest distance service estimates a shortest distance between the first node and the second node using the first sketch and the second sketch by:
  for each of the plurality of seed sets of nodes, determining the absolute value of the difference between the shortest distance from the first node to the seed set of nodes and the shortest distance from the second node to the seed set of nodes; and
  selecting the greatest determined absolute value as the estimated shortest distance between the first node and the second node.

9. The system of claim 1, wherein the first sketch comprises a distance between the first node and each node of a first set of nodes from the graph and the second sketch comprises a distance between the second node and each node of a second set of nodes from the graph, and the shortest distance service estimates a shortest distance between the first node and the second node using the first sketch and the second sketch by:
  determining the nodes that are in both the first set of nodes and the second set of nodes;
  for each of the determined nodes, determining the sum of a distance between the first node and the determined node and a distance between the second node and the determined node; and
  selecting the least determined sum as the estimated shortest distance between the first node and the second node.

10. A method comprising:
  receiving a graph by a computing device, wherein the graph comprises a plurality of nodes;
  selecting a seed set of nodes from the plurality of nodes by the computing device;
  generating a first sketch for a first node of the graph and a second sketch for a second node of the graph based on the selected seed set by the computing device;
  receiving an indicator of the first node and an indicator of the second node by the computing device;
  retrieving the first sketch and the second sketch by the computing device; and
  estimating a shortest distance between the first node and the second node using the first sketch and the second sketch by the computing device.

11. The method of claim 10, wherein generating the first sketch based on the selected seed set comprises determining a node from the seed set that is closest to the first node, and adding an indicator of the closest node from the seed set of nodes and a distance between the first node and the closest node to the first sketch.

12. The method of claim 11, wherein determining the node from the seed set of nodes that is closest to the first node is determined using a breadth first search.

13. The method of claim 11, further comprising repeating selecting a seed set, determining a node from the seed set that is closest to the first node, and adding an indicator of the closest node from the seed set of nodes and a distance between the first node and the closest node to the first sketch with increasingly larger seed sets at each iteration.

14. The method of claim 13, wherein the seed set increases by a factor of two at each iteration.

15. The method of claim 10, wherein selecting the seed set of nodes from the plurality of nodes comprises randomly selecting nodes from the plurality of nodes.

16. The method of claim 15, wherein nodes from the plurality of nodes with a greater number of edges are favored when randomly selecting nodes from the plurality of nodes.

17. The method of claim 10, wherein the first sketch comprises a shortest distance from the first node to each of a plurality of seed sets of nodes from the graph and the second sketch comprises a shortest distance from the second node to each of the plurality of seed sets of nodes from the graph, and estimating a shortest distance between the first node and the second node using the first sketch and the second sketch comprises:
  for each of the plurality of seed sets of nodes, determining the absolute value of the difference between the shortest distance from the first node to the seed set of nodes and the shortest distance from the second node to the seed set of nodes; and
  selecting the greatest determined absolute value as the estimated shortest distance between the first node and the second node.

18. The method of claim 10, wherein the first sketch comprises a distance between the first node and each node of a first set of nodes from the graph and the second sketch comprises a distance between the second node and each node of a second set of nodes from the graph, and estimating a shortest distance between the first node and the second node using the first sketch and the second sketch comprises:
  determining the nodes that are in both the first set of nodes and the second set of nodes;
  for each of the determined nodes, determining the sum of a distance between the first node and the determined node and a distance between the second node and the determined node; and
  selecting the least determined sum as the estimated shortest distance between the first node and the second node.

19. A method comprising:
  receiving a graph by a computing device, wherein the graph comprises a plurality of nodes;
  selecting a seed set of nodes from the plurality of nodes by the computing device;
  generating a first sketch for a first node of the graph and a second sketch for a second node of the graph based on the selected seed set by the computing device; and
  storing the generated first sketch and second sketch by the computing device.

20. The method of claim 19, wherein generating the first sketch based on the selected seed set comprises determining a node from the seed set that is closest to the first node, and adding an indicator of the closest node from the seed set of nodes and a distance between the first node and the closest node to the first sketch.

* * * * *